(12) United States Patent
Aoyagi et al.

(10) Patent No.: US 7,946,365 B2
(45) Date of Patent: May 24, 2011

(54) CONTROL METHOD FOR FUEL CELL VEHICLE, AND FUEL CELL VEHICLE

(75) Inventors: Satoshi Aoyagi, Shimotsuke (JP); Hibiki Saeki, Utsunomiya (JP); Kenichiro Kimura, Utsunomiya (JP); Hiroaki Takanohashi, Sakura (JP); Hiroyuki Abe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1117 days.

(21) Appl. No.: 11/701,735

(22) Filed: Feb. 1, 2007

(65) Prior Publication Data

US 2007/0199747 A1 Aug. 30, 2007

(30) Foreign Application Priority Data

Feb. 3, 2006 (JP) .............................. P2006-026965

(51) Int. Cl.
*B60L 8/00* (2006.01)
(52) U.S. Cl. .................................. 180/65.1; 180/65.31
(58) Field of Classification Search ................ 180/65.1, 180/65.21, 65.22, 65.24, 65.285, 65.29, 65.31, 180/65.8; 318/139; 320/101; 290/40 C; 429/22, 23; 363/51; 477/2, 3, 7; 701/22
See application file for complete search history.

(56) References Cited

U.S. PATENT DOCUMENTS

| | | | |
|---|---|---|---|
| 6,615,940 B2 * | 9/2003 | Morisawa | 180/65.1 |
| 2004/0065489 A1 * | 4/2004 | Aberle et al. | 180/65.1 |
| 2004/0106022 A1 * | 6/2004 | Saito et al. | 429/22 |

FOREIGN PATENT DOCUMENTS

| | | |
|---|---|---|
| JP | 2003-208913 | 7/2003 |
| JP | 2004-039506 | 2/2004 |
| JP | 2005-348530 | 12/2005 |

OTHER PUBLICATIONS

Japanese Office Action for Application No. 2006-026965, dated Jan. 19, 2010.

* cited by examiner

*Primary Examiner* — J. Allen Shriver, II
*Assistant Examiner* — Bridget Avery
(74) *Attorney, Agent, or Firm* — Nelson Mullins Riley & Scarborough LLP; Anthony A. Laurentano, Esq.; John A. Curran, Esq.

(57) ABSTRACT

This control method for a fuel cell vehicle includes: a target motor output power obtaining step which obtains a target motor output power corresponding to an accelerator opening degree; and a high output power control step which controls operations of a first DC-DC converter and a second DC-DC converter, such that an output voltage of a power source becomes equal to or larger than a predetermined voltage that is required for securing a desired motor output power, when the target motor output power is larger than a predetermined output power threshold value.

12 Claims, 4 Drawing Sheets

CONTROL METHOD FOR FUEL CELL VEHICLE, AND FUEL CELL VEHICLE

BACKGROUND OF THE INVENTION

Priority is claimed on Japanese Patent Application No. 2006-026965, filed Feb. 3, 2006, the contents of which are incorporated herein by reference.

FIELD OF THE INVENTION

The present invention relates to a control method for a fuel cell vehicle, and a fuel cell vehicle.

DESCRIPTION OF THE RELATED ART

A conventional power controller is known which is provided with, for example: a charging controller which converts output voltage of a fuel cell to charging voltage of a secondary battery; and a discharging controller which converts discharging voltage of the secondary battery to output voltage of the fuel cell, wherein the output voltage of the fuel cell and the discharged voltage of the secondary battery which was converted so as to be substantially equivalent to the output voltage of the fuel cell, are input to a converter of a power converter (for example, refer to Japanese Unexamined Patent Application, First Publication No. 2003-208913).

In addition, a conventional fuel cell system is known which: when electrical power consumed by a load is larger than electrical power generated by a fuel cell, the shortage with respect to the electrical power consumed by the load is compensated by electrical power equal to or less than predetermined threshold electrical power purchased from a commercial power supply (for example, night electrical power or the like) and discharged electrical power from a power storage cell; and when the electrical power consumed by the load is less than the electrical power generated by the fuel cell, a surplus of the output electrical power is charged into the power storage cell (for example, refer to Japanese Unexamined Patent Application, First Publication No. 2004-39506).

In the above-mentioned conventional power controller, since the output voltage of the fuel cell and the discharged voltage of the secondary battery which was converted so as to be substantially equivalent to the output voltage of the fuel cell are input into the converter of the power converter, it was impossible to appropriately change the ratio between the output power input from the fuel cell into the converter of the power converter, and the output power input from the secondary battery into the converter of the power converter. Therefore, it was difficult to secure desired output power, while, for example, protecting the fuel cell and the secondary battery in accordance with operation state of the fuel cell and charging state of the secondary battery.

In addition, in the conventional fuel cell system, since distributions of the electrical power to be supplied from the fuel cell and the power storage cell to the load is merely set in accordance with the electrical power purchased from the commercial power supply, it was difficult, for example, to appropriately set the distribution of each electrical power to be supplied from the commercial power supply, the fuel cell, and the power storage cell to the load, while considering each switching losses at an AC/DC converter connected to the load, and at a DC/DC converter arranged between the fuel cell and the power storage cell.

The present invention was made in view of the above-mentioned circumstances and has an object of providing a control method for a fuel cell vehicle, and a fuel cell vehicle which can perform an efficient electrical power converting operation to a power source formed from a fuel cell and a power storage device while preventing deterioration in traveling performance of a vehicle by securing desired motor output power.

SUMMARY OF THE INVENTION

In order to achieve the above-mentioned object, the present invention employed the followings.

That is, the present invention employed a control method for a fuel cell vehicle including a motor being a driving source of the fuel cell vehicle, a motor controller for controlling an operation status of the motor, and a fuel cell system being a power source for the motor. The fuel cell system includes: a fuel cell which receives reaction gasses and performs electrochemical reactions to generate an electrical power; a power storage device which is charged with the generated electrical power from the fuel cell and a regeneration power from the motor; a first DC-DC converter provided between the power storage device and the motor controller; and a second DC-DC converter provided between the fuel cell and the motor controller. The control method for a fuel cell vehicle includes: a target motor output power obtaining step which obtains a target motor output power corresponding to an accelerator opening degree; and a high output power control step which controls operations of the first DC-DC converter and the second DC-DC converter, such that an output voltage of the fuel cell system becomes equal to or larger than a predetermined voltage that is required for securing a desired motor output power, when the target motor output power is larger than a predetermined output power threshold value.

According to the control method for a fuel cell vehicle, even when, for example, the motor output power decreases from the desired motor output power in accordance with reducing voltage to be applied to the motor in a range where the reducing voltage becomes equal to or less than the predetermined voltage, it is possible to prevent the motor output power from becoming less than the desired motor output power by controlling the first DC-DC converter and the second DC-DC converter such that the output power voltage of the hybrid-type power source constructed from the fuel cell and the power storage device (i.e., voltage to be supplied to the motor controller constructed from the inverter which applies voltage to the motor, and the like) becomes equal to or over the predetermined voltage. Accordingly, even in a high output power state in which the target motor output power becomes larger than the predetermined output power threshold value, it is possible to secure the motor output power corresponding to the target motor output power.

The high output power control step may include: a remaining capacity determination step which determines whether remaining capacity of the power storage device is equal to or less than a predetermined remaining capacity threshold value; a voltage-increasing step which controls a voltage-increasing operation of the second DC-DC converter when the remaining capacity is determined to be equal to or less than the predetermined remaining capacity threshold value in the remaining capacity determination step; and a power storage device output power limiting step which controls an operation of the first DC-DC converter such that an output electrical power of the power storage device becomes equal to or less than a predetermined electrical power threshold value when the remaining capacity in the remaining capacity determination step is determined to be equal to or less than the predetermined remaining capacity threshold value.

According to the control method for a fuel cell vehicle, when the remaining capacity of the power storage device is determined to be equal to or less than the predetermined remaining capacity threshold value, by controlling an operation of the first DC-DC converter such that the output electrical power of the power storage device becomes equal to or less than the predetermined electrical power threshold value, it is possible to prevent problems such as deterioration of the power storage device due to, for example, excessive reduction in the remaining capacity of the power storage device.

Furthermore, it is possible to secure the desired motor output power in response to the accelerator opening degree, since the motor controller constructed from an inverter that applies voltage to the motor, and the like, is supplied with the voltage obtained by the voltage-increasing operation to the output power of the fuel cell by the second DC-DC converter.

The high output power control step may include: a direct connecting step which sets the second DC-DC converter to a directly connected state when the remaining capacity in the remaining capacity determination step is determined to be larger than the predetermined remaining capacity threshold value; and a switching control step which controls a switching operation of the first DC-DC converter when the remaining capacity in the remaining capacity determination step is determined to be larger than the predetermined remaining capacity threshold value.

According to the control method for a fuel cell vehicle, when the remaining capacity of the power storage device is determined to be larger than the predetermined remaining capacity threshold value, by connecting the fuel cell and the motor controller in a directly connected manner, it is possible to prevent switching losses produced at the second DC-DC converter. Furthermore, since the motor controller constructed from the inverter that applies voltage to the motor, and the like, is supplied with voltage obtained by switching operation to the output power of the power storage device by the first DC-DC converter, it is possible to secure the desired motor output power in response to the accelerator opening degree without excessively increasing the output power of the fuel cell (i.e., without excessively consuming reaction gasses supplied to the fuel cell).

The control method for a fuel cell vehicle may further include: a low-and-middle output power control step which controls operations of the first DC-DC converter and the second DC-DC converter such that a supply of an output electrical power from the fuel cell to the motor takes priority over a supply of an output electrical power from the power storage device to the motor, when the target motor output power is equal to or less than the predetermined output power threshold value.

According to the control method for a fuel cell vehicle, while in a low-and-middle output power state in which the target motor output power becomes equal to or less than the predetermined output power threshold value, by limiting or terminating the output power supplied from the power storage device, and by supplying, in first, the output electrical power of the fuel cell that is relatively lager than that of the power storage device, to the motor, it is possible to prevent increasing switching losses at first DC-DC converter, and thereby enabling efficiently securing the motor output power in response to the target motor output power.

The low-and-middle output power control step may include: a direct connecting step which sets the second DC-DC converter to a directly connected state; and a power storage device output power terminating step which controls an operation of the first DC-DC converter such that an output electrical power from the power storage device becomes zero.

According to the control method for a fuel cell vehicle, while in a low-and-middle output power state in which the target motor output power becomes equal to or less than the predetermined output power threshold value, by terminating the output power supplied from the power storage device, and by connecting the motor controller with the fuel cell that has relatively lager output power than that of the power storage device, in a directly connected manner, it is possible to prevent switching losses produced at the first DC-DC converter and the second DC-DC converter, and thereby enabling efficiently securing the motor output power in response to the target motor output power.

The low-and-middle output power control step may include: a direct connecting step which sets the second DC-DC converter to a directly connected state; and a switching control step which controls a switching operation of the first DC-DC converter when the target motor output power is larger than an output power of the motor that corresponds to an output electrical power of the fuel cell.

According to the control method for a fuel cell vehicle, while in a low-and-middle output power state in which the target motor output power becomes equal to or less than the predetermined output power threshold value, by connecting the motor controller with the fuel cell that has relatively lager output power than that of the power storage device, in a directly connected manner, it is possible to prevent switching losses produced at the second DC-DC converter. Furthermore, the deficiency with respect to the target motor output power (i.e., the difference between the target motor output power and the output power of the motor in response to the output electrical power of the fuel cell in the directly connected state) is appropriately secured by supplying the motor controller with voltage obtained by switching operation of the first DC-DC converter to the output voltage of the power storage device.

In addition, the present invention also provides a fuel cell vehicle including a motor being a driving source of the fuel cell vehicle, a motor controller for controlling an operation status of the motor, and a fuel cell system being a power source for the motor. The fuel cell system includes: a fuel cell which receives reaction gasses and performs electrochemical reactions to generate an electrical power; a power storage device which is charged with the generated electrical power from the fuel cell and a regeneration power from the motor; a first DC-DC converter provided between the power storage device and the motor controller; and a second DC-DC converter provided between the fuel cell and the motor controller. The fuel cell vehicle includes: a target motor output power obtaining device which obtains a target motor output power corresponding to an accelerator opening degree; and a high output power controller which controls operations of the first DC-DC converter and the second DC-DC converter, such that an output voltage of the power source becomes equal to or larger than a predetermined voltage that is required for securing a desired motor output power, when the target motor output power is larger than a predetermined output power threshold value.

According to the fuel cell vehicle, even when, for example, the motor output power decreases from the desired motor output power in accordance with reducing voltage to be applied to the motor in a range where the reducing voltage becomes equal to or less than the predetermined voltage, it is possible to prevent the motor output power from becoming less than the desired motor output power by controlling the first DC-DC converter and the second DC-DC converter such that the output power voltage of the hybrid-type power source constructed from the fuel cell and the power storage device (i.e., voltage to be supplied to the motor controller constructed from the inverter which applies voltage to the motor, and the like) becomes equal to or over the predetermined voltage. Accordingly, even in a high output power state in which the target motor output power becomes larger than the predetermined output power threshold value, it is possible to secure the motor output power corresponding to the target motor output power.

The high output power controller may include: a remaining capacity determination device which determines whether remaining capacity of the power storage device is equal to or less than a predetermined remaining capacity threshold value; a voltage-increasing device which controls a voltage-increasing operation of the second DC-DC converter when the remaining capacity is determined to be equal to or less than the predetermined remaining capacity threshold value by the remaining capacity determination device; a voltage-increasing device which controls a voltage-increasing operation of the second DC-DC converter when the remaining capacity is determined to be equal to or less than the predetermined remaining capacity threshold value by the remaining capacity determination device; and a power storage device output power limiting device which controls an operation of the first DC-DC converter such that an output electrical power of the power storage device becomes equal to or less than a predetermined electrical power threshold value when the remaining capacity is determined to be equal to or less than the predetermined remaining capacity threshold value by the remaining capacity determination device.

According to the fuel cell vehicle, when the remaining capacity of the power storage device is determined to be equal to or less than the predetermined remaining capacity threshold value, by controlling an operation of the first DC-DC converter such that the output electrical power of the power storage device becomes equal to or less than the predetermined electrical power threshold value, it is possible to prevent problems such as deterioration of the power storage device due to, for example, excessive reduction in the remaining capacity of the power storage device.

Furthermore, it is possible to secure the desired motor output power in response to the accelerator opening degree, since the motor controller constructed from an inverter that applies voltage to the motor, and the like, is supplied with the voltage obtained by the voltage-increasing operation to the output power of the fuel cell by the second DC-DC converter.

The high output power controller may include: a direct connecting device which sets the second DC-DC converter to a directly connected state when the remaining capacity is determined to be larger than the predetermined remaining capacity threshold value by the remaining capacity determination device; and a switching controller which controls a switching operation of the first DC-DC converter when the remaining capacity is determined to be larger than the predetermined remaining capacity threshold value by the remaining capacity determination device.

According to the fuel cell vehicle, when the remaining capacity of the power storage device is determined to be larger than the predetermined remaining capacity threshold value, by connecting the fuel cell and the motor controller in a directly connected manner, it is possible to prevent switching losses produced at the second DC-DC converter. Furthermore, since the motor controller constructed from inverter that applies voltage to the motor, and the like, is supplied with voltage obtained by switching operation to the output power of the power storage device by the first DC-DC converter, it is possible to secure the desired motor output power in response to the accelerator opening degree without excessively increasing the output power of the fuel cell (i.e., without excessively consuming reaction gasses supplied to the fuel cell).

The fuel cell vehicle may further include a low and middle output power controller which controls operations of the first DC-DC converter and the second DC-DC converter such that a supply of an output electrical power from the fuel cell to the motor takes priority over a supply of an output electrical power from the power storage device to the motor, when the target motor output power is equal to or less than the predetermined output power threshold value.

According to the fuel cell vehicle, while in a low-and-middle output power state in which the target motor output power becomes equal to or less than the predetermined output power threshold value, by limiting or terminating the output power supplied from the power storage device, and by supplying, in first, the output electrical power of the fuel cell that is relatively lager than that of the power storage device, to the motor, it is possible to prevent increasing switching losses at first DC-DC converter, and thereby enabling efficiently securing the motor output power in response to the target motor output power.

The low-and-middle output power controller may include: a direct connecting device which sets the second DC-DC converter to a directly connected state; and a power storage device output power terminating device which controls an operation of the first DC-DC converter such that an output electrical power from the power storage device becomes zero.

According to the fuel cell vehicle, while in a low-and-middle output power state in which the target motor output power becomes equal to or less than the predetermined output power threshold value, by terminating the output power supplied from the power storage device, and by connecting the motor controller with the fuel cell that has relatively lager output power than that of the power storage device, in a directly connected manner, it is possible to prevent switching losses produced at the first DC-DC converter and the second DC-DC converter, and thereby enabling efficiently securing the motor output power in response to the target motor output power.

The low-and-middle output power controller may include: a direct connecting device which sets the second DC-DC converter to a directly connected state; and a switching controller which controls a switching operation of the first DC-DC converter when the target motor output power is larger than an output power of the motor that corresponds to an output electrical power of the fuel cell.

According to the control method for a fuel cell vehicle, while in a low-and-middle output power state in which the target motor output power becomes equal to or less than the predetermined output power threshold value, by connecting the motor controller with the fuel cell that has relatively lager output power than that of the power storage device, in a directly connected manner, it is possible to prevent switching losses produced at the second DC-DC converter. Furthermore, the deficiency with respect to the target motor output power (i.e., the difference between the target motor output power and the output power of the motor in response to the output electrical power of the fuel cell in the directly connected state) is appropriately secured by supplying the motor controller with voltage obtained by switching operation of the first DC-DC converter to the output voltage of the power storage device.

DETAILED DESCRIPTION OF THE INVENTION

A fuel cell vehicle and a control method for a fuel cell vehicle, according to one embodiment of the present invention will be explained below with reference to the drawings.

Figure 1:
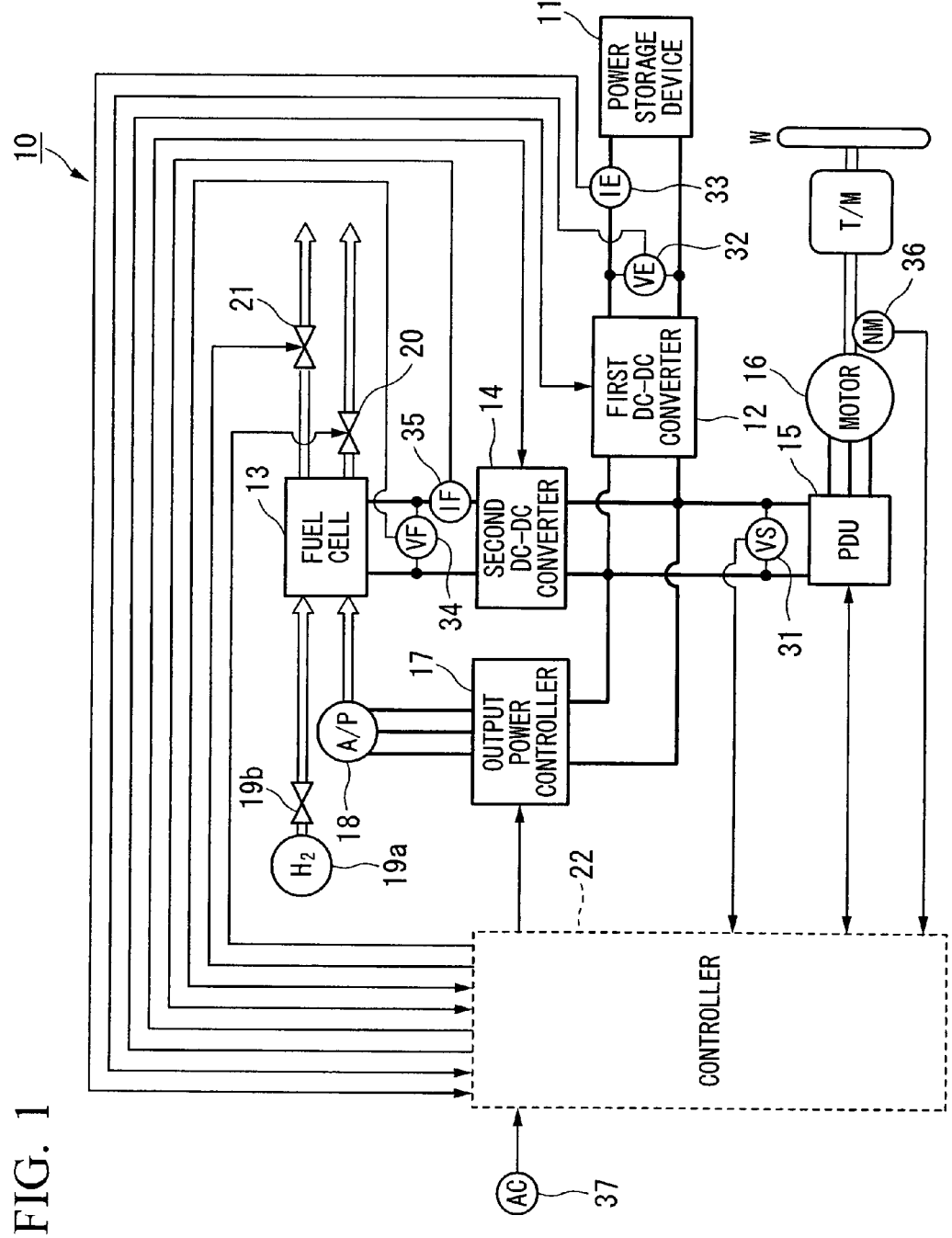
FIG. 1 shows a construction of a fuel cell vehicle according to one embodiment of the present invention.

As shown in FIG. 1 for example, a fuel cell vehicle 10 of the present invention includes a power storage device 11, a first DC-DC converter 12, a fuel cell 13, a second DC-DC converter 14, a PDU (a Power Drive Unit) 15, a motor 16, an output power controller 17, an air-supply device (A/P) 18, a hydrogen tank 19a and a hydrogen supply valve 19b, a back-pressure valve 20, a purging valve 21, a controller 22, a system voltage sensor 31, a first voltage sensor 32, a first current sensor 33, a second voltage sensor 34, a second current sensor 35, a motor rotation number sensor 36, and an accelerator-opening degree sensor 37.

The power storage device 11 is a capacitor or a battery or the like formed from, for example, an electric double layer condenser, an electrolytic condenser, or the like. The power storage device 11 is connected with the second DC-DC converter 14 and the PDU 15 in a parallel manner, via the interactive first DC-DC converter 12.

The first DC-DC converter 12 is formed so as to include, for example, an interactive chopper-type power conversion circuit which can increase the terminal voltage VE and can decrease the system voltage VS of the of the power storage device 11. The first DC-DC converter 12 controls the output current IE output from the power storage device 11, by chopping operations for intermitting the voltage applied to the load and the current supplied to the load, that is, by ON and OFF operations (switching operations) of a switching element provided in the chopper-type power conversion circuit. The switching operations are controlled in accordance with a duty of a control pulse input from the controller 22 (i.e., the ratio of ON and OFF operations).

That is, the first DC-DC converter 12 can charge the power storage device 11 by decreasing the system voltage VS which relates to the generation of the fuel cell 13 or the regenerating operations of the motor 16. In addition, the first DC-DC converter 12 can increase the terminal voltage VE of the power storage device 11 and apply it to the PDU 15.

Furthermore, the first DC-DC converter 12 prohibits outputting the output current IE from the power storage device 11 in accordance with operating status of the fuel cell vehicle 10. In this case, when, for example, the duty of the control pulse input from the controller 22 to the first DC-DC converter 12 is set to 0%, then the switching element provided in the first DC-DC converter 12 is fixed to OFF-state, and the power storage device 12 and the PDU 15 are thereby electrically disconnected. Furthermore, in this case, when, for example, the duty of the control pulse is set to a suitable value within a range between 0% and 100%, ON and OFF operations of the switching element provided in the first DC-DC converter 12 are controlled such that the output power of the first DC-DC converter 12 becomes zero.

Thus, each measurement signals from the first voltage sensor 32 which measures the terminal voltage VE of the power storage device 11, and the first current sensor 33 which measures the charging current and discharging current of the power storage device 11, is input to the controller 22.

The fuel cell 13 includes a plurality of layers of fuel cells, each fuel cell being an electrolytic electrode structure formed from a solid high-polymer electrolytic membrane formed from a cation-exchanging membrane and the like, sandwiched between a fuel electrode (an anode) formed from an anode catalyst and a gas-diffusion layer and an oxygen electrode (a cathode) formed from a cathode catalyst and a gas-diffusion layer, wherein the electrolytic electrode structure is further sandwiched between a pair separators. And these stacked fuel cells are sandwiched between a pair of end plates from both sides in the stacking direction thereof.

Air being an oxidant gas (reaction gas) including oxygen is supplied from the air-supply device 18 having an air compressor and the like to the cathode of the fuel cell 13, while fuel gas (reaction gas) including hydrogen is supplied from, for example, the highly pressurized hydrogen tank 19a via the hydrogen-supply valve 19b to the anode of the fuel cell 13.

Then, hydrogen ionized by catalytic reactions on the anode catalyst of the anode migrates to the cathode via the suitably humidified solid high-polymer electrolytic membrane. In addition, electrons generated accompanied by this migration are extracted to an external circuit and used as direct current electrical energy. At the cathode at this time, hydrogen ions, electrons, and oxygen react and produce water.

Moreover, the hydrogen-supply valve 19b is for example a pneumatic type of proportional pressure control valve which takes the pressure of air supplied from the air-supply device 18 as a signal pressure, and controls the pressure at the point of exit from the hydrogen-supply valve 19b of the hydrogen gas passing through the hydrogen-supply valve 19b so as to be within a predetermined range that corresponds to the signal pressure.

In addition, the air-supply device 18 having an air compressor and the like takes air from, for example, the outside of the fuel cell vehicle, compresses, and supplies the air as reaction gas to the cathode of the fuel cell 13. In addition, the rotation number of the motor (not illustrated) which drives the air-supply device 18 is controlled by the output power controller 17 having, for example, a PWM inverter that operates in a pulse width modulation mode (PWM), based on control instruction sent from the controller 22.

Then, the unreacted discharged gas discharged from the hydrogen discharging outlet 13a of the fuel cell 13 is introduced into a dilution box (not illustrated) via a discharging control valve (not illustrated) which is openably and closably controlled by the controller 22, and is discharged to the outside (atmosphere or the like) via the purging valve 21 after the hydrogen concentration thereof is reduced in the dilution box to a predetermined concentration.

Moreover, a part of the unreacted discharged gas discharged from the hydrogen discharging outlet 13a of the fuel cell 13 is introduced into a circulation path (not illustrated) having, for example, a circulation pump (not illustrated), an ejector (not illustrated), and the like. Hydrogen supplied from the hydrogen tank 19a and the discharged gas discharged from the fuel cell 13 are mixed, and are again supplied to the fuel cell 13.

Then, the unreacted discharged gas discharged from an air-discharging outlet 13b of the fuel cell 13 is discharged to the outside (atmosphere or the like) via the backpressure valve 20 of which a valve opening degree is controlled by the controller 22.

The second DC-DC converter 14 is formed so as to include, for example, an interactive chopper-type power conversion circuit which can increase and decrease the output voltage VF of the fuel cell 13. The second DC-DC converter 14 controls the output current IF output from the fuel cell 13, by chopping operations for intermitting the voltage applied to the load and the current supplied to the load, that is, by ON and OFF operations (switching operations) of a switching element provided in the chopper-type power conversion circuit. The switching operations are controlled in accordance with a duty of a control pulse input from the controller 22 (i.e., the ratio of ON and OFF operations).

For example, the second DC-DC converter 14 increases the output voltage VF of the fuel cell 13 in accordance with the driving status of the fuel cell vehicle 10. In this case, the duty of the control pulse is set to the suitable value within a range between 0% and 100%, the output current IF of the fuel cell 13 being a primary current is suitably limited in accordance with the duty of the control pulse, and the limited current is output as a secondary current.

Furthermore, the second DC-DC converter 14 sets a direct connection between the fuel cell 13 and the PDU 15, in accordance with the driving state of the fuel cell vehicle 10. In this case, if the duty of the control pulse is set to 100% and if the switching element is fixed to ON-state, then the output voltage VF of the fuel cell 13 and the system voltage VS which is an input voltage of the PDU 15 become the equivalent values with each other.

Each measurement signals output from the second voltage sensor 34 which measures the output voltage VF of the fuel cell 13 and the second current sensor 35 which measures the output current IF of the fuel cell 13, are input to the controller 22.

The fuel cell 13 and the power storage device 11 forming the fuel cell system work as batteries for the motor 16.

The PDU 15 is provided with, for example, a PWM inverter that operates in a pulse width modulation mode (PWM), and controls the driving and the regenerating operation of the motor 16 based on control instruction sent from the controller 22. This PWM inverter is provided with a bridge circuit which is formed by connecting a plurality of, for example, transistor switching elements so as to form a bridge. While, for example, driving the motor 16, the PWM inverter transforms the direct current powers output from the first DC-DC converter 12 and the second DC-DC converter 14 to three-phase alternating current power based on the pulse width modulation signal input from the controller 22, and then supplies it to the motor 16. On the other hand, while the motor 16 is in a regenerating operation, the three-phase alternating current power output from the motor 16 is converted to the direct current power, and the direct current power is supplied to the power storage device 11 via the first DC-DC converter 12 to charge the power storage device 11.

Moreover, the motor 16 is formed, for example, by a permanent magnet type three-phase alternating current synchronous motor that uses permanent magnets for the magnetic field, and is controlled so as to be driven by three-phase alternating current power supplied from the PDU 15. While the fuel cell vehicle is in deceleration, if driving power is transmitted from the driving wheels WF to the motor 16, the motor 16 also works as a generator, and produces so-called regenerative braking force to recover the kinetic energy of the fuel cell vehicle 10 as an electric energy.

The controller 22 controls the power-generating state of the fuel cell 13 by outputting instructions for the pressure and the flow rate of the reaction gas supplied from the air-supply device 18 to the fuel cell 13, and an instruction for valve opening degree of the backpressure valve 20 based on, for example, the driving state of the fuel cell vehicle, the concentration of the hydrogen contained in the reaction gas supplied to the anode of the fuel cell 13, the concentration of the hydrogen contained in the discharged gas discharged from the anode of the fuel cell 13, and the power generating state of the fuel cell 13 (for example, the voltage between terminals of the plurality of fuel cells, the output voltage VF of the fuel cell 13, the output current IF output from the fuel cell 13, and the internal temperature of the fuel cell 13).

Furthermore, the controller 22 controls an electrical power converting operation of the PWM inverter provided in the PDU 15. While driving the motor 16 for example, the controller 22 calculates a torque instruction which is an instruction value for the torque output from the motor 16, based on the measurement signal output from the accelerator-opening degree sensor 37 which measures an accelerator opening degree AC that corresponds to the accelerator-driving operation amount by the driver, and the measurement signal output from the motor rotation number sensor 36, with reference to, for example, a torque instruction map or the like which was set in advance so as to indicate the predetermined relationship of the accelerator opening degree AC, the rotation number NM, and the torque instruction. Then, the controller 22 calculates the target motor output power which is necessary for making the motor 16 output the torque that corresponds to the torque instruction. Then, in accordance with the target motor output power, the controller 22 sets the switching instruction (i.e., the pulse width modulation signal) formed from pulses for driving ON and OFF of the switching element of the PWM inverter, by the pulse width modulation (PWM).

When the switching instruction is input from the controller 22 to the PDU 15, the current sequentially flows through the stator loop windings (not illustrated) of each phases of the motor 16. With this, the magnitude of the applied voltage (i.e., amplitude) and phases in U-phase, V-phase, and W-phase are controlled. Then, phase currents for U-phase, V-phase, and W-phase, which correspond to the torque instruction will be supplied to each phases of the motor 16.

Therefore, the measurement signal output from the system voltage sensor 31 which measures the system voltage VS being an input voltage for, for example, the PDU 15; the measurement signal output from the motor rotation number sensor 36 which measures the rotation number NM of the motor 16 (i.e., motor rotational number); and the measurement signal output from the accelerator-opening degree sensor 37 which measures the accelerator opening degree AC that corresponds to the accelerator operation amount by the driver, are input to the controller 22.

In addition, the controller 22 calculates the remaining capacity SOC of the power storage device 11 by, for example, calculating an integrating charging amount and an integrating discharging amount by integrating the charging current and the discharging current of the power storage device 11 for each predetermined time interval, and by adding these integrating charging amount and integrating discharging amount to a remaining capacity at the initial state or the before of starting charging and discharging, or subtracting these integrating charging amount and integrating discharging amount from the remaining capacity at the initial state or the before of starting charging and discharging.

Then, the controller 22 outputs a control pulse for controlling the electrical power converting operations of the second DC-DC converter 14 in accordance with the target motor output power and the remaining capacity SOC of the power storage device 11, controls the value of the output current IF output from the fuel cell 13, outputs the control pulse for controlling the electrical power converting operations of the first DC-DC converter 12, and thereby controls charging and discharging of the power storage device 11.

Accordingly, each measurement signals output from the first voltage sensor 32 which measures the terminal voltage VE of the power storage device 11 and the first current sensor 33 which measures the charging current and the discharging current of the power storage device 11, is input to the controller 22.

The fuel cell vehicle 10 according to the present embodiment of the present invention has the above-mentioned construction, and the operations of the controller 22, that is, the control method for a fuel cell vehicle 10 will be explained below with reference to drawings.

Firstly, an explanation will be made below for operations for controlling the first DC-DC converter 12 and the second DC-DC converter 14 such that, when the target motor output power exceeds the predetermined output power threshold value, the system voltage VS of the fuel cell system provided with the fuel cell 13 and the power storage device 11 which work as batteries for the motor 16 becomes equal to or over the predetermined voltage that is necessary for securing the desired motor output power.

As shown in for example FIG. 2 and Table 1 shown below, at a duration C1 from time t0 to t1 where applied voltage to the motor 16 reaches predetermined voltage V2, in a duration from t0 to tm where the fuel cell vehicle 10 starts and accelerates, the first DC-DC converter 12 is set to an OFF-state in which an electrical connection is terminated or is set to execute a switching operation in which the output electrical power becomes zero, while the second DC-DC converter 14 is set to ON-state which is an electrically direct-connected state. In accordance with this, extraction of the output current IE from the power storage device 11 is prohibited, and the motor 16 is supplied with the output current IF from the fuel cell 13, which is relatively large output comparing to that of the power storage device 11. In addition, while the output electrical power from the power storage device 11 is maintained to zero, the output electrical power from the fuel cell 13 and the supply electrical power to the motor 16 gradually increase from zero to the suitable electrical power P2 for example.

At this time, in a predetermined characteristics between the output current IF and the output voltage VF of the fuel cell 13 (i.e., an I-V characteristics), since the output voltage VF decreases in accordance with the increasing output current IF, the output voltage VF of the fuel cell 13 and the applied voltage to the motor 16 gradually decrease from the suitable voltage V3 to the predetermined voltage V2 (<V3) for example. In addition, the remaining capacity SOC of the power storage device 11 maintains the suitable remaining capacity SOC3.

Then, when the fuel cell vehicle 10 is in the acceleration state (i.e., in a state in which the output power of the motor 16 changes in a increasing tendency), the following operations are performed at a duration C2: from time t1 where the supply electrical power to the motor 16 reaches the suitable electrical power P2 to time t2 where the output power of the motor 16 reaches the predetermined output power threshold value upon the supply electrical power to the motor 16 reaching to the predetermined electrical power threshold value Pa; and where the applied voltage to the motor 16 reaches the predetermined voltage V2. That is, in the duration C2, if, for example, power-assisting (assist) is executed by the power storage device 11, then the first DC-DC converter 12 is set to execute a voltage-increasing operation (i.e., a switching operation) to the terminal voltage VE of the power storage device 11, while the second DC-DC converter 14 is set to ON-state which is an electrically direct-connected state.

At this time, the power-generating state of the fuel cell 13 is controlled such that the output electrical power thereof maintains the suitable electrical power P2, and thereby maintaining the output voltage VF of the fuel cell 13 and the applied voltage to the motor 16, to be the predetermined voltage V2. In accordance with this, extraction of the output current IE from the power storage device 11 is started, and the output current IE from the power storage device 11 and the output current IF from the fuel cell 13 are supplied to the motor 16. As a result, the output electrical power from the power storage device 11 and the supply electrical power to the motor 16 gradually increase while the output electrical power from the fuel cell 13 maintains the suitable electrical power P2. Then, the remaining capacity SOC of the power storage device 11 changes so as to decrease from the suitable remaining capacity SOC3.

Figure 3:
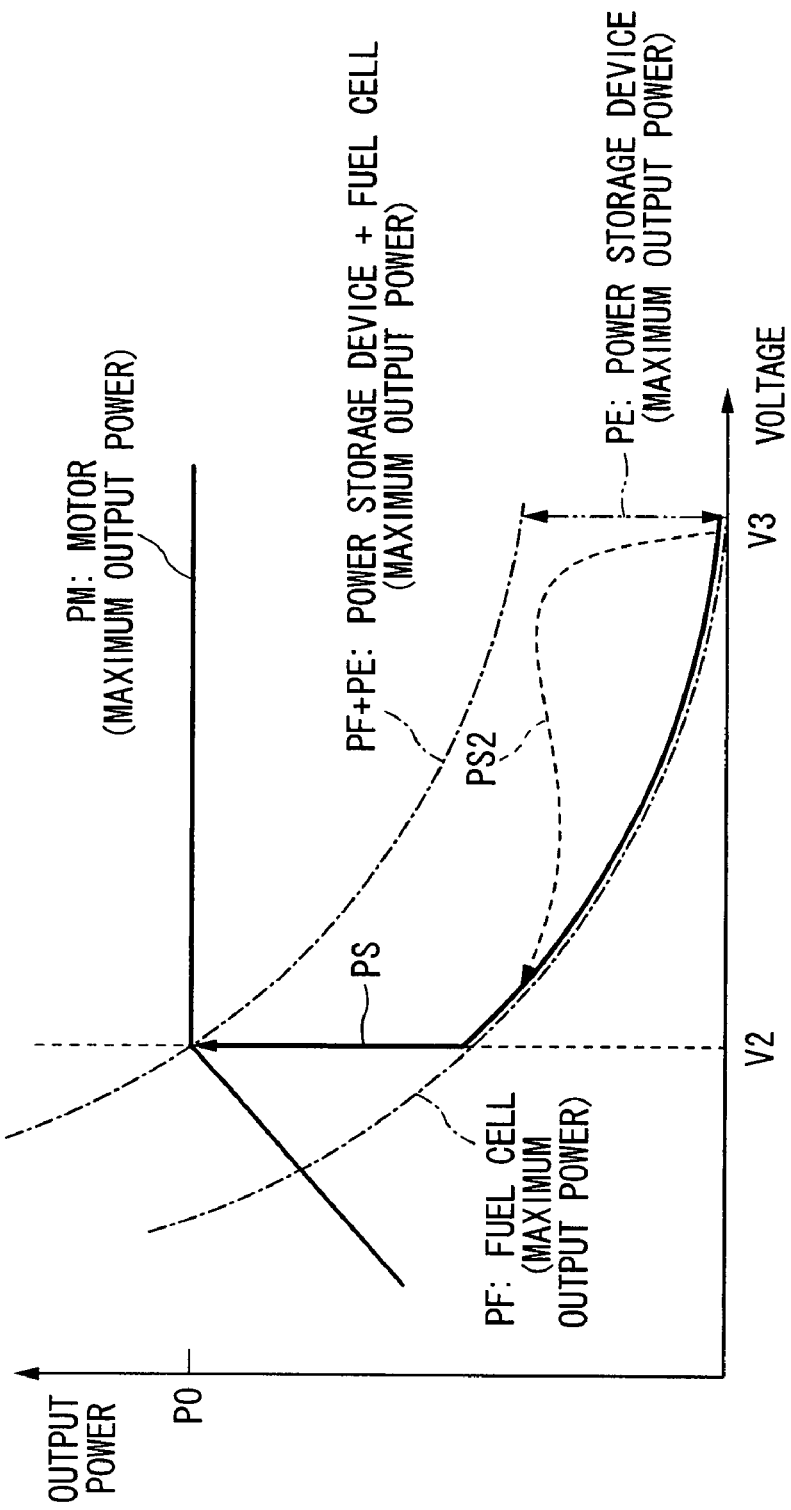
FIG. 3 shows: a graph showing one example of predetermined characteristics at a voltage applied to the motor and a maximum output power that can be output from the motor; a graph showing one example of characteristics of the fuel cell; and a graph showing one example of predetermined characteristics of the power storage device.

Here, as shown in FIG. 3 for example, in a predetermined characteristics PM which indicates the relation between the applied voltage to the motor 16 and the maximum output power that can be output from the motor 16, the following operations are performed. That is, in a region where the applied voltage to the motor 16 is equal to or larger than the predetermined voltage V2, the maximum output power that can be output from the motor 16 maintains the predetermined value P0 ($\geq$P3) regardless of the change in the applied voltage, while in a region where the applied voltage to the motor 16 is less than the predetermined voltage V2, the maximum output power of the motor 16 changes so as to decrease in accordance with the decreasing applied voltage. Accordingly, by prohibiting the applied voltage to the motor 16 to become, at least, less than the predetermined voltage V2, it is possible to prohibit the maximum output that can be output from the motor 16 decreasing to below the predetermined value P0.

In accordance with this, as shown in FIG. 3 for example, in a duration from time t0 to time t1 where the applied voltage to the motor 16 changes so as to decrease from the suitable voltage V3 to the predetermined voltage V2, the maximum output power PS of the fuel cell system equipped with the power storage device 11 and the fuel cell 13 which are the batteries of the motor 16, changes along the output characteristics PS of the fuel cell 13, that changes such that the

TABLE 1

|  | C1 | C2 | C3 | C4 | C5 |
|---|---|---|---|---|---|
| First DC-DC Converter | OFF/Switching (Zero Power) | Switching (Increasing Voltage) | Switching (Increasing Voltage) | Switching (Increasing Voltage) | OFF/Switching (Zero Power) |
| Second DC-DC Converter | ON (Direct Connection) | ON (Direct Connection) | ON (Direct Connection) | Switching (Increasing Voltage) | Switching (Increasing Voltage) | maximum output power increases in accordance with the reducing output voltage VF. Then, after the time t1, and after the applied voltage to the motor 16 reaches the predetermined voltage V2, it changes along the output power characteristics PE of the power storage device 11 that can increase the maximum output power while maintaining the output voltage VE so as to be the suitable value.

Moreover, when the target motor output power at the suitable applied voltage is larger than the maximum output power of the fuel cell 13, such as, for example, when the fuel cell vehicle 10 makes a jackrabbit start, output power-assisting (assist) by the power storage device 11 is executed. As a result, the maximum output power PS2 of the fuel cell system changes along the output power characteristics which is the sum of the output power characteristics PF of the fuel cell 13 and the output power of the power storage device 11.

Figure 2:
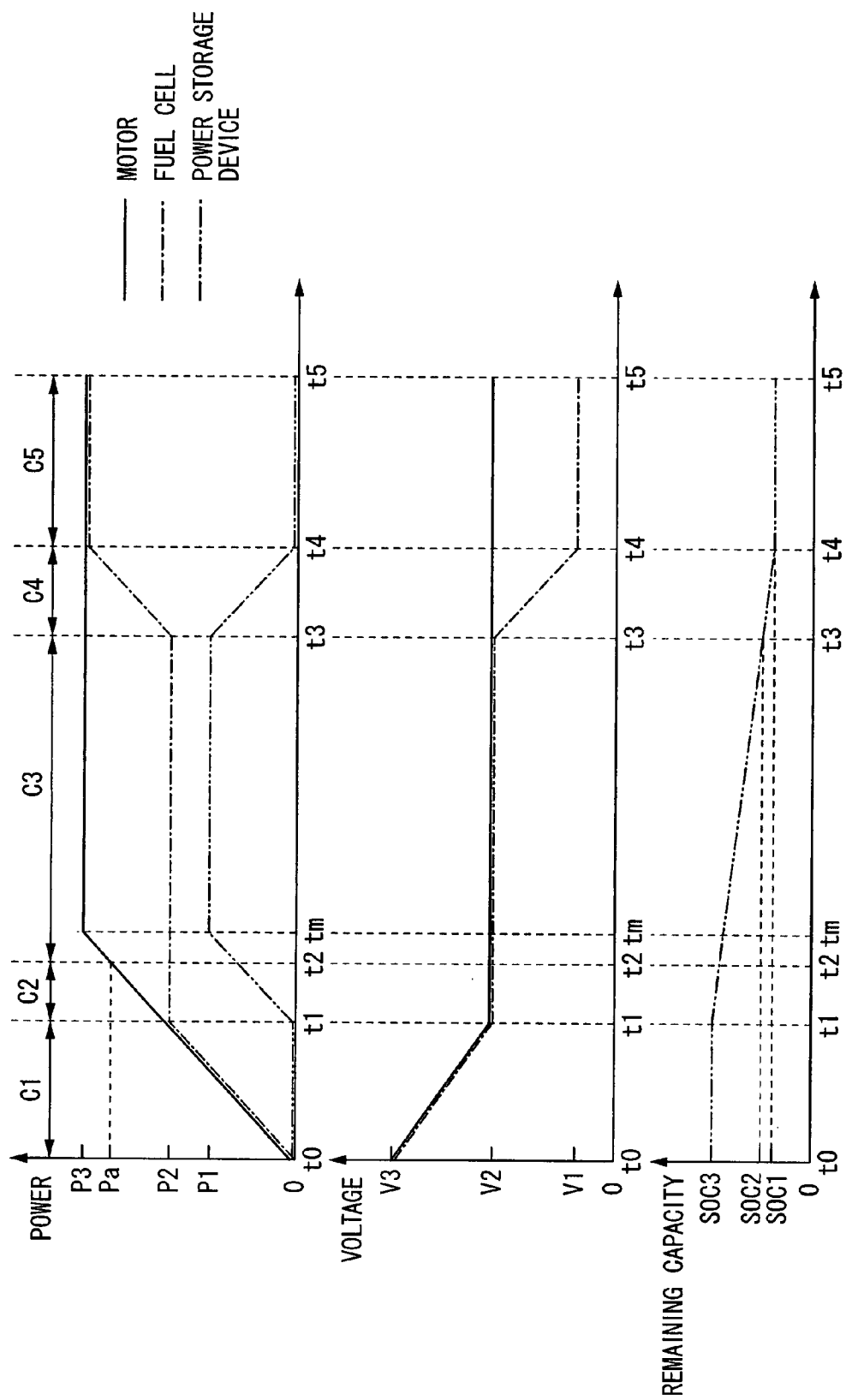
FIG. 2 shows: a graph showing one example of a time history of a supply electrical power to a motor, and output electrical powers of a fuel cell and a power storage device; a graph showing one example of a time history of a supply voltage to the motor, and an output voltage of the fuel cell; and a graph showing one example of a time history of a remaining capacity of a power storage device.

Then, as shown in FIG. 2 for example, such as when the fuel cell vehicle 10 moves from the acceleration state to the normal driving state, the following operations are performed in duration C3 which includes: duration from time t2 to time tm where the supply electrical power to the motor 16 increases from the predetermined electrical power threshold value Pa to the suitable electrical power P3; and duration from time tm to t3 where the supply electrical power to the motor 16 is controlled so as to maintain the electrical power P3. That is, when execution of the output power-assisting (assist) by the power storage device 11 is instructed for example, the first DC-DC converter 12 is set so as to execute the voltage-increasing operation (i.e., the switching operation) to the terminal voltage VE of the power storage device 11, while the second DC-DC converter 14 is set to ON-state which is an electrically direct-connected state.

At this time, the power-generating state of the fuel cell 13 is controlled such that the output electrical power thereof maintains the suitable electrical power P2, and it is set such that the output voltage VF of the fuel cell 13 and the applied voltage to the motor 16 maintain the predetermined voltage V2.

In addition, the switching operation of the first DC-DC converter 12 is controlled such that: the output electrical power of the power storage device 11 changes so as to increase to the suitable electrical power P1 (<P2) in a duration from time t2 to time tm; and the output electrical power of the power storage device 11 maintains the suitable electrical power P1 in a duration from time tm to time t3.

In accordance with this, the motor 16 is supplied with the output current IE from the power storage device 11 and the output current IF from the fuel cell 13; the supply electrical power to the motor 16 increases from the predetermined electrical power threshold value Pa to the suitable electrical power P3 in a duration from time t2 to time tm; and the supply electrical power to the motor 16 is maintained to be the suitable electrical power P3, while the remaining capacity SOC of the power storage device 11 changes so as to decrease to the predetermined remaining capacity SOC2, in a duration from time tm to time t3.

Then, when the output current IE from the power storage device 11 is supplied to the motor 16 (i.e., when the remaining capacity SOC of the power storage device 11 changes so as to decrease), if execution of the output power-assisting (assist) by the power storage device 11 is instructed in a duration C4 from time t3 where the remaining capacity SOC reaches the predetermined remaining capacity SOC2, to time t4 where the remaining capacity SOC reaches the predetermined lower limit remaining capacity SOC1, the following operations are performed. That is, the first DC-DC converter 12 is set so as to execute the voltage-increasing operation (i.e., a switching operation) to the terminal voltage VE of the power storage device 11, while the second DC-DC converter 14 is set so as to execute the voltage-increasing operation (i.e., a switching operation) to the output voltage VF of the fuel cell 13.

At this time, the switching operation of the first DC-DC converter 12 is controlled such that the output electrical power from the power storage device 11 changes so as to decrease from, for example, the suitable electrical power P1 to zero. In addition, the power-generating state of the fuel cell 13 is controlled such that the output electrical power increase from the suitable electrical power P2 to the electrical power P3, to cancel the reduction in the output electrical power of the power storage device 11. Then, the switching operation of the second DC-DC converter 14 is controlled such that the applied voltage to the motor 16 maintains the predetermined voltage V2 by canceling the reduction in the output voltage VF that occurs in accordance with increasing output power from the fuel cell 13. In accordance with this, the supply electrical power to the motor 16 is maintained to be the suitable electrical power P3. In addition, while the applied voltage to the motor 16 is maintained to be the predetermined voltage V2: the output electrical power of the fuel cell 13 changes in an increasing tendency; the output voltage of the fuel cell 13 changes in a decreasing tendency; the output electrical power of the power storage device 11 changes in a decreasing tendency; and the remaining capacity SOC of the power storage device 11 changes in a decreasing tendency.

Then, when the supply electrical power to the motor 16 is controlled so as to maintain the suitable electrical power P3, at duration C5 from time t4 to time t5 where the remaining capacity SOC reaches the predetermined lower limit remaining capacity SOC1, if execution of an output power assisting (assist) by the power storage device 11 is prohibit, the first DC-DC converter 12 is set to OFF-state in which electrical connection is terminated, or to executing the switching operation in which the output electrical power becomes zero, while the second DC-DC converter 14 is set so as to execute the voltage-increasing operation (i.e., a switching operation) to the output voltage VF of the fuel cell 13.

In accordance with this, extraction of the output current IE from the power storage device 11 is prohibited, and thereby the remaining capacity SOC of the power storage device 11 maintains the predetermined lower limit remaining capacity SOC1. Then, the output current IF from the fuel cell 13 is supplied to the motor 16. And, when the output electrical power from the power storage device 11 is zero, the output electrical power of the fuel cell 13 and the supply electrical power to the motor 16 are set so as to maintain the suitable electrical power P3. In addition, it is set such that the output voltage VF of the fuel cell 13 maintains the suitable voltage V1, while the supply voltage to the motor 16 maintains the predetermined voltage V2.

Processes for controlling operations of the first DC-DC converter 12 and the second DC-DC converter 14 in accordance with the target motor output power and the remaining capacity SOC of the power storage device 11 will be explained below.

Figure 4:
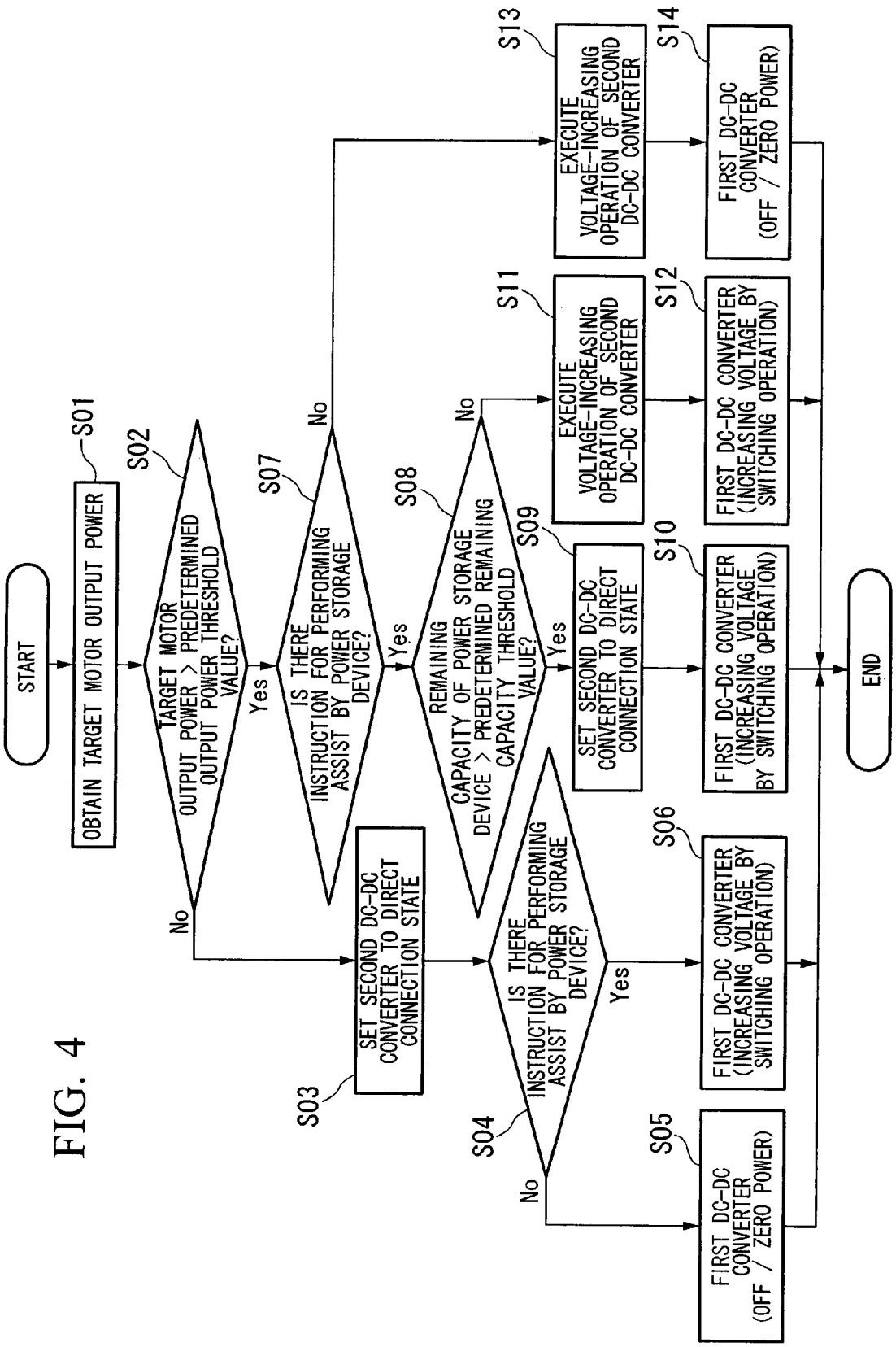
FIG. 4 shows a flowchart indicating a control method for a fuel cell vehicle shown in FIG. 1.

Firstly, in step S01 shown in FIG. 4, for example, a torque instruction for the torque output from the motor 16 is calculated based on measurement signal of the accelerator opening degree AC output from the accelerator opening degree sensor 37, measurement signal of the rotation number NM output from the motor rotation number sensor 36, and the like. In addition, target motor output power is calculated that is necessary for making the motor 16 output the torque corresponding to the torque instruction.

Next, in step S02, it is determined whether the target motor output power is larger than the predetermined output power threshold value or not.

If the determination is "YES", then the process proceeds to after-mentioned step S07.

On the other hand, if the determination is "NO", then the process proceeds to step S03.

In step S03, the second DC-DC converter 14 is set to ON state which is an electrically direct-connected state, and it is also set such that the output current IF of the fuel cell 13, that is a relatively larger output comparing to that of the power storage device 11 is supplied with high priority to the motor 16.

Next, in step S04, it is determined whether, for example, execution of output power assisting (assist) by the power storage device 11 is instructed or not.

If the determination is "YES", then the process proceeds to after-mentioned step S06.

On the other hand, if the determination is "NO", then the process proceeds to step S05.

Next, in step S05, the first DC-DC converter 12 is set to OFF-state where an electrical connection between the power storage device 11 and an electrical load (i.e., the PDU 15 and the output controller 17) is terminated, or to the switching operation where output electrical power from the first DC-DC converter 12 becomes zero. Then, like at the duration C1 shown in the above-mentioned Table 1 for example, extraction of the output current IE from the power storage device 11 is prohibited, and a series of processes is terminated.

In addition, in step S06, in order to execute assisting to the output electrical power of the fuel cell vehicle 10 by the output electrical power from the power storage device 11, the first DC-DC converter 12 is set to execute the voltage-increasing operation (i.e., a switching operation) to the terminal voltage VE of the power storage device 11, like at the duration C2 shown in the above-mentioned Table 1. Then, a series of processes is terminated.

In addition, in step S07, it is determined whether, for example, execution of the output power assisting (assist) by the power storage device 11 is instructed or not.

If the determination is "NO", then the process proceeds to the after-mentioned step S13.

If the determination is "YES", then the process proceeds to step S08.

In step S08, it is determined whether the remaining capacity SOC of the power storage device 11 is larger than the predetermined remaining capacity threshold value (for example, the predetermined remaining capacity SOC2 shown in FIG. 2) or not.

If the determination is "NO", then the process proceeds to the after-mentioned step S11.

On the other hand, If the determination is "YES", then the process proceeds to step S09.

In step S09, like at duration C3 shown in the above-mentioned Table 1 for example, the second DC-DC converter 14 is set to ON-state which is an electrically direct-connected state, and thereby controlling the power generating state of the fuel cell 13 such that the output voltage VF of the fuel cell 13 and the applied voltage to the motor 16 maintain the predetermined voltage V2.

Next, in step S10, while the output electrical power of the power storage device 11 changes in an increasing tendency, or is stable, the first DC-DC converter 12 is set so as to execute the voltage-increasing operation (i.e., a switching operation) to the terminal voltage VE of the power storage device 11, such that the applied voltage to the motor 16 maintains the predetermined voltage V2. Then, the assisting to the target motor output power (output power assisting) by the output electrical power from the power storage device 11 is executed, and then a series of processes is terminated.

In addition, in step S11, like at duration C4 shown in the above-mentioned Table 1 for example, the second DC-DC converter 14 is set so as to execute the voltage-increasing operation (i.e., a switching operation) to the output voltage VF of the fuel cell 13, and thereby controlling such that the applied voltage to the motor 16 maintains the predetermined voltage V2.

Then, in step S12, the first DC-DC converter 12 is set so as to execute voltage-increasing operation (i.e., a switching operation) to the terminal voltage VE of the power storage device 11, such that the applied voltage to the motor 16 maintains the predetermined voltage V2 while the output electrical power of the power storage device 11 changes in a decreasing tendency, and thereby executing an assisting (output power assisting) by the output electrical power of the power storage device 11 to the target motor output power. Then, a series of processes is terminated.

In addition, in step S13, like at duration C5 shown in the above-mentioned Table 1 for example, the second DC-DC converter 14 is set to execute a voltage-increasing operation (i.e., a switching operation) to the output voltage VF of the fuel cell 13, and thereby controlling the applied voltage to the motor 16 to maintain the predetermined voltage V2.

Then, in step S14, the first DC-DC converter 12 is set so as to OFF-state where an electrical connection between the power storage device 11 and an electrical load (i.e., the PDU 15 and the output controller 17) is terminated, or to the switching operation where output electrical power from the first DC-DC converter 12 becomes zero. Then, like at the duration C1 shown in the above-mentioned Table 1 for example, extraction of the output current IE from the power storage device 11 is prohibited, and a series of processes is terminated.

As has been explained in the above, according to the fuel cell vehicle 10 and the control method for the fuel cell vehicle 10, of the present embodiment, when the target motor output power is larger than the predetermined output power threshold value, by controlling operations of the first DC-DC converter 12 and the second DC-DC converter 14 such that the system voltage VS of the fuel cell system equipped with the power storage device 11 and the fuel cell 13 which are the batteries of the motor 16, becomes equal to or larger than the predetermined voltage required for securing the desired motor output power, it is possible to prevent reducing the maximum output power that can be output from the motor 16, and thereby enabling securing the desired acceleration performance of the fuel cell vehicle 10.

Furthermore, while the applied voltage to the motor 16 is maintained to be equal to or larger than the predetermined voltage that is required for securing the desired motor output power (for example, the voltage V2 shown in FIG. 3), by controlling so as to prevent the execution of the switching operations of the first DC-DC converter 12 and the second DC-DC converter 14 at the same time, and thereby executing only one of the switching operations in accordance with a driving state of the fuel cell vehicle 10, it is possible to increase switching losses that is accompanied by the switching operations of the first DC-DC converter 12 and the second DC-DC converter 14, and thereby enabling executing efficient electrical power converting operation as a whole fuel cell system.

Moreover, in the above-mentioned embodiment, in the durations C1 and C5 shown in the above-mentioned Table 1 for example, the first DC-DC converter 12 is set to the OFF-state in which the electrical connection is terminated or is set to execute a switching operation in which the output electrical power becomes zero; however, the present invention is not limited to this construction. For example, assisting (output power assisting) by the output electrical power of the power storage device 11 to the target motor output power may be executed by controlling the switching operation of the first DC-DC converter 12 such that the output voltage of the power storage device 11 becomes equal to or less than the predetermined electrical power threshold value.

While a preferred embodiment of the invention has been described and illustrated above, it should be understood that this is an exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

<Explanations for Reference Symbols>

10 . . . fuel cell vehicle; 11 . . . power storage device; 12 . . . first DC-DC converter; 13 . . . fuel cell; 14 . . . second DC-DC converter; 15 . . . PDU (motor controller); 16 . . . motor; 17 . . . output controller; 18 . . . air supply device (reaction gas supply device); 19a . . . hydrogen tank (reaction gas supply device); 19b . . . hydrogen supply valve (reaction gas supply device); step S01 . . . target motor output power obtaining device, target motor output power obtaining step; step S03 . . . direct connecting device, direct connecting step; step S05 . . . power storage device output power terminating device, power storage device output power terminating step; step S06 . . . switching controller, switching control step; step S07 . . . remaining capacity determination device, remaining capacity determination step; step S08 . . . direct connecting device, direct connecting step; step S09 . . . switching controller, switching control step; step S10 . . . voltage-increasing device, voltage-increasing step; step S11 . . . power storage device output power limiting device, power storage device output power limiting step; step S03 to step S06 . . . low-and-middle output power controller, low-and-middle output power control step; step S07 to step S11 . . . high output power controller, high output power control step.

What is claimed is:

1. A control method for a fuel cell vehicle including a motor being a driving source of the fuel cell vehicle, a motor controller for controlling an operation status of the motor, and a fuel cell system being a power source for the motor,
said fuel cell system including: a fuel cell which receives reaction gasses and performs electrochemical reactions to generate an electrical power, a power storage device which is charged with the generated electrical power from the fuel cell and a regeneration power from the motor; a first DC-DC converter provided between the power storage device and the motor controller; and a second DC-DC converter provided between the fuel cell and the motor controller, the first DC-DC converter and the second DC-DC converter both including switching elements, the switching elements performing switching operations to control voltage,
said control method for a fuel cell vehicle comprising:
obtaining a target motor output power corresponding to an accelerator opening degree; and
controlling operation of the first DC-DC converter and the second DC-DC converter, such that an output voltage of the fuel cell system becomes equal to or larger than a predetermined voltage that is required for securing a desired motor output power, when the target motor output power is larger than a predetermined output power threshold value.

2. The control method for a fuel cell vehicle according to claim 1, wherein
said controlling step comprises:
determining whether remaining capacity of the power storage device is equal to or less than a predetermined remaining capacity threshold value;
controlling a voltage-increasing operation of the second DC-DC converter when the remaining capacity is determined to be equal to or less than the predetermined remaining capacity threshold value in the remaining capacity determination step; and
controlling an operation of the first DC-DC converter such that an output electrical power of the power storage device becomes equal to or less than a predetermined electrical power threshold value when the remaining capacity in the remaining capacity determination step is determined to be equal to or less than the predetermined remaining capacity threshold value.

3. The control method for a fuel cell vehicle according to claim 1, further comprising:
controlling operations of the first DC-DC converter and the second DC-DC converter such that a supply of an output electrical power from the fuel cell to the motor takes priority over a supply of an output electrical power from the power storage device to the motor, when the target motor output power is equal to or less than the predetermined output power threshold value.

4. The control method for a fuel cell vehicle according to claim 2, wherein
said controlling step comprises:
setting the second DC-DC converter to a directly connected state when the remaining capacity in the remaining capacity determination step is determined to be larger than the predetermined remaining capacity threshold value; and
controlling a switching operation of the first DC-DC converter when the remaining capacity in the remaining capacity determination step is determined to be larger than the predetermined remaining capacity threshold value.

5. The control method for a fuel cell vehicle according to claim 3, wherein
said controlling step further comprises:
setting the second DC-DC converter to a directly connected state; and
controlling an operation of the first DC-DC converter such that an output electrical power from the power storage device becomes zero.

6. The control method for a fuel cell vehicle according to claim 3, wherein
said controlling step further comprises:
setting the second DC-DC converter to a directly connected state; and
controlling a switching operation of the first DC-DC converter when the target motor output power is larger than an output power of the motor that corresponds to an output electrical power of the fuel cell.

7. A fuel cell vehicle including a motor being a driving source of the fuel cell vehicle, a motor controller for controlling an operation status of the motor, and a fuel cell system being a power source for the motor,
said fuel cell system including: a fuel cell which receives reaction gasses and performs electrochemical reactions to generate an electrical power; a power storage device which is charged with the generated electrical power from the fuel cell and a regeneration power from the motor; a first DC-DC converter provided between the power storage device and the motor controller; and a second DC-DC converter provided between the fuel cell and the motor controller, the first DC-DC converter and the second DC-DC converter both including switching elements, the switching elements performing switching operations to control voltage, wherein said fuel cell vehicle comprises;

a target motor output power obtaining device which obtains a target motor output power corresponding to an accelerator opening degree; and a high output power controller which controls operations for the first DC-DC converter and the second DC-DC converter, such that an output voltage of the fuel cell system becomes equal to or larger than a predetermined voltage that is required for securing a desired motor output power, when the new target motor output power is larger than a predetermined output power threshold value.

8. The fuel cell vehicle according to claim 7, wherein said high output power controller comprises:

a remaining capacity determination device which determines whether remaining capacity of the power storage device is equal to or less than a predetermined remaining capacity threshold value;

a voltage-increasing device which controls a voltage-increasing operation of the second DC-DC converter when the remaining capacity is determined to be equal to or less than the predetermined remaining capacity threshold value by the remaining capacity determination device; and a power storage device output power limiting device which controls an operation of the first DC-DC converter such that an output electrical power of the power storage device becomes equal to or less than a predetermined electrical power threshold value when the remaining capacity is determined to be equal to or less than the predetermined remaining capacity threshold value by the remaining capacity determination device.

9. The fuel cell vehicle according to claim 7, further comprising a low-and-middle output power controller which controls operations of the first DC-DC converter and the second DC-DC converter such that a supply of an output electrical power from the fuel cell to the motor takes priority over a supply of an output electrical power from the power storage device to the motor, when the target motor output power is equal to or less than the predetermined output power threshold value.

10. The fuel cell vehicle according to claim 8, wherein said high output power controller comprises:

a direct connecting device which sets the second DC-DC converter to a directly connected state when the remaining capacity is determined to be larger than the predetermined remaining capacity threshold value by the remaining capacity determination device; and a switching controller which controls a switching operation of the first DC-DC converter when the remaining capacity is determined to be larger than the predetermined remaining capacity threshold value by the remaining capacity determination device.

11. The fuel cell vehicle according to claim 9, wherein said low-and-middle output power controller comprises:

a direct connecting device which sets the second DC-DC converter to a directly connected state; and a power storage device output power terminating device which controls an operation of the first DC-DC converter such that an output electrical power from the power storage device becomes zero.

12. The fuel cell vehicle according to claim 9, wherein said low-and-middle output power controller comprises:

a direct connecting device which sets the second DC-DC converter to a directly connected state; and a switching controller which controls a switching operation of the first DC-DC converter when the target motor output power is larger than an output power of the motor that corresponds to an output electrical power of the fuel cell.

* * * * *